United States Patent [19]
Rich et al.

[11] Patent Number: 5,488,721
[45] Date of Patent: Jan. 30, 1996

[54] SYSTEM AND METHOD FOR APPLYING VISITOR LOCK AND PERSISTENT LOCK FLAGS TO CONTROL UNITS OF WORK BOUNDARIES IN AN OBJECT ORIENTED ENVIRONMENT

[75] Inventors: William L. Rich, Stone Mountain; Floyd W. Shackelford, Beauford, both of Ga.

[73] Assignee: International Business Machines Corporation, Armonk, N.Y.

[21] Appl. No.: 444,654

[22] Filed: May 19, 1995

Related U.S. Application Data

[63] Continuation of Ser. No. 9,580, Jan. 26, 1993, abandoned.

[51] Int. Cl.⁶ .................................................. G06F 17/30
[52] U.S. Cl. .................................... 395/600; 364/DIG. 1; 364/228.7; 364/246.6; 364/281.3; 364/281.4; 364/281.7; 364/282.1; 364/286
[58] Field of Search ...................................... 395/600

[56] References Cited

U.S. PATENT DOCUMENTS

| | | | |
|---|---|---|---|
| 4,723,211 | 2/1988 | Barker et al. | 395/147 |
| 5,129,083 | 7/1992 | Cutler et al. | 395/600 |
| 5,134,696 | 7/1992 | Brown et al. | 395/425 |
| 5,136,712 | 8/1992 | Perazzoli, Jr. et al. | 395/700 |
| 5,220,657 | 6/1993 | Bly et al. | 395/425 |
| 5,261,069 | 11/1993 | Wilkenson et al. | 395/425 |
| 5,265,206 | 11/1993 | Shackelford et al. | 395/200 |
| 5,287,521 | 2/1994 | Nitta et al. | 395/725 |
| 5,297,279 | 3/1994 | Bannon et al. | 395/600 |
| 5,313,629 | 5/1994 | Abraham et al. | 395/600 |
| 5,315,703 | 5/1994 | Matheny et al. | 395/164 |
| 5,335,346 | 8/1994 | Fabbio | 395/600 |
| 5,355,477 | 10/1994 | Strickland et al. | 395/600 |

OTHER PUBLICATIONS

*Optimal Selection of Dynamically Available Database Access Plans*, IBM Technical Disclosure Bulletin, vol. 34, No. 10A, Mar. 1992, pp. 376–379.

Primary Examiner—Thomas G. Black
Assistant Examiner—Wayne Amsbury
Attorney, Agent, or Firm—Bell, Seltzer, Park & Gibson

[57] ABSTRACT

Boundary control of units of work in an object oriented computing environment is provided by a visitor locking system and method and a persistent object locking system and method. The object management table includes a visitor lock flag and a persistent lock flag for each unit of work. The object manager prevents copying of an object from a first unit of work to a second unit of work in response to the visitor lock flag associated with the first unit of work being in a first state, and allows copying of the object from the first unit of work to the second unit of work in response to the visitor lock flag being in a second state. The object manager also locks an object from a first unit of work in response to the persistent lock flag associated therewith being in a first state, and unlocks the object from the first unit of work in response to the persistent lock flag being in a second state. Copying and locking may apply to persistent objects only. Locking may prevent addition of objects to, and deletion of objects from, the unit of work.

20 Claims, 8 Drawing Sheets

SYSTEM AND METHOD FOR APPLYING VISITOR LOCK AND PERSISTENT LOCK FLAGS TO CONTROL UNITS OF WORK BOUNDARIES IN AN OBJECT ORIENTED ENVIRONMENT

This application is a continuation of application Ser. No. 08/009,580, filed Jan. 26, 1993, now abandoned

FIELD OF THE INVENTION

This invention relates to data processing systems and methods and more particularly to object oriented computing environments.

BACKGROUND OF THE INVENTION

Object oriented programming systems and processes, also referred to as "object oriented computing environments", have been the subject of much investigation and interest in state of the art data processing environments. As is well known to those having skill in the art, object oriented computing environments are composed of a large number of "objects". An object is a data structure, also referred to as a frame, and a set of operations or functions, also referred to as "methods", that can access that data structure. The frame has many "slots" each of which contains an "attribute" of the data in the slot. The attribute may be a primitive (such as an integer or string) or an object reference (OREF) which is a pointer to another object.

Each defined object will usually be manifested in a number of "instances". Each instance contains the particular data structure for a particular example of the object. In an object oriented computing environment, the data is processed by requesting an object to perform one of its methods by sending the object a "message". The receiving object responds to the message by choosing the method that implements the message name, executing this method on the named instance, and returning control to calling high level routine along with the results of the method.

Object oriented programming systems may be used as database management systems which are capable of operating upon a large database, and which are expandable and adaptable. In an object oriented database management system, the data in the database is organized and encapsulated in terms of objects, with the instances of the objects being the data in the database. Similarly, the database manager may be organized as a set of objects, with database management operations being performed by sending messages from one object to another. The target object performs the requested action on its attributes using its methods.

A major concern of object oriented database management systems is preserving data integrity. Preservation of data integrity is difficult as the size and complexity of the database increases. Moreover, for a very large database it is desirable to have multiple tasks performed concurrently, thereby further impacting data integrity.

A major advancement in preserving data integrity of object oriented computing environments is the "unit of work". The unit of work is an object class including multiple unit of work objects and multiple unit of work instances. The unit of work allows the object oriented database system to manipulate, update, allocate and discard memory in terms of sets of objects and operations upon objects, rather than by manipulating memory pointers as in traditional languages like C and Pascal.

The unit of work and its operation are described in detail in Application Ser. No. 07/425,607 to Abraham et al., filed Oct. 23, 1989, entitled Unit of Work for Preserving Data Integrity of a Database, and assigned to the assignee of the present invention, the disclosure of which is hereby incorporated herein by reference. As described therein, the database manager includes a unit of work manager. The unit of work manager assigns a unit of work instance to each task to be performed by copying the objects which are to be processed during a database task into a unit of work instance. A version of the object instances in the unit of work instance, referred to as a unit of work level, is created for each step in the task. Each unit of work level for a task includes a copy of the data objects which are to be modified by the task. Each step in the task is controlled to modify the data elements in the associated unit of work level, rather than the data elements in the database itself. The unit of work class also includes associated methods for "commit", "discard", "new", "notify", "rollback", "start" and "switch". These methods allow the unit of work instance to be manipulated as a whole to ensure database integrity.

As described above, an object oriented computing environment typically includes an object management table which is used to keep track of all the objects which are currently being used. The use of the object management table in connection with the unit of work is described in application Ser. No. 07/602,442 filed Oct. 23, 1990 to Shackelford et al. entitled A Messenger and Object Manager to Implement an Object Oriented Environment, assigned to the assignee of the present invention, the disclosure of which is hereby incorporated herein by reference. The object management table is used to manage the creation of new unit of work instances and to manage the creation of new unit of work levels within a unit of work instance. Switching, commits and rollbacks of unit of work levels and instances are also managed. As described in detail in the above mentioned application, the object management table is typically a multidimensional array including four related components: an Object Management Table Main Class (OMTMC) table, an Object Management Table Unit of Work Instance Information Class (OMTUC) table, an Object Management Table Object Instance Information (OMTIC) table, and an Object Management Table Frame Information Class (OMTFC) table. Entries in these tables are controlled by the object manager to control operation of the object oriented computing environment.

Notwithstanding the improvement of the unit of work in maintaining database integrity, it is important that the unit of work instances do not interact with each other to impact database integrity. For example, the unit of work system allows a "visitor" object, which is a copy of the object in the current unit of work, which is materialized from the other unit of work in which it resides at the time a message is sent, rather than being materialized from the database. However, the ability to produce visitor objects may cause objects to be placed in a unit of work from another unit of work rather than from the database. Data integrity may be impacted since the unit of work may include intermediate data which has been changed by the database management system. On the other hand, there are many instances where a unit of work legitimately can obtain a visitor object from another unit of work.

Similarly, on some occasions it may be desirable to allow persistent objects in a unit of work level to be modified, changed or deleted, but on other occasions it may be undesirable. As is well known to those having skill in the art, object oriented computing environments include persistent objects which must survive run time and which are stored in nonvolatile storage. If a persistent object is unknowingly changed, database integrity can be impacted. Accordingly, there is a need for a boundary control mechanism for units of work in an object oriented computing environment.

SUMMARY OF THE INVENTION

It is therefore an object of the present invention to provide an improved object oriented computing environment.

It is another object of the present invention to provide an object oriented computing environment including unit of work objects and instances.

It is still another object of the invention to provide a boundary control for units of work within an object oriented computing environment.

These and other objects are provided by the present invention by a visitor locking system and method and a persistent object locking system and method which apply to units of work in the object oriented computing environment. In particular, the object management table which includes a listing of the units of work and pointers to the objects contained therein, further includes a "visitor lock" flag for each unit of work and a "persistent lock" flag for each unit of work. Each flag may be in a first or second state.

The object manager prevents copying of an object from a first unit of work to a second unit of work in response to the visitor lock flag associated with the first unit of work being in the first state, and allows copying of the object from the first unit of work to the second unit of work in response to the visitor lock flag associated with the first unit of work being in the second state. The object manager also locks an object within a first unit of work in response to the persistent lock flag associated therewith in the first state, and unlocks the object from within the first unit of work in response to the persistent lock flag associated therewith being in the second state.

In particular, in response to the persistent visitor lock flag being in the first state, the object manager prevents copying of a persistent object from a first unit of work to a second unit of work and allows copying of a persistent object from the nonvolatile storage to the second unit of work. When the visitor lock flag is in the second state, copying of the persistent object from the first unit of work to the second unit of work is allowed.

In response to the persistent lock flag, the object manager locks and unlocks a unit of work by allowing or preventing additions, deletions or any changes to objects from a first unit of work. Preferably, locking or unlocking, such as addition, deletion or change preventing and allowing, is applied to persistent objects in the unit of work in response to the persistent lock flag associated therewith.

It will be understood by those having skill in the art that visitor locking and object locking may be used separately to control the boundaries of units of work. However, preferably they are used together to provide robust boundary control for units of work. The boundaries of units of work can thereby be controlled as a whole, to prevent corruption of the data therein.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Prior to describing the system and method for controlling boundaries of units of work according to the present invention, a general overview of object oriented database management systems and methods will be provided. A general description of the system and method of the present invention will then be provided, followed by a detailed design description.

Object Oriented Computing Environment

Figure 1:
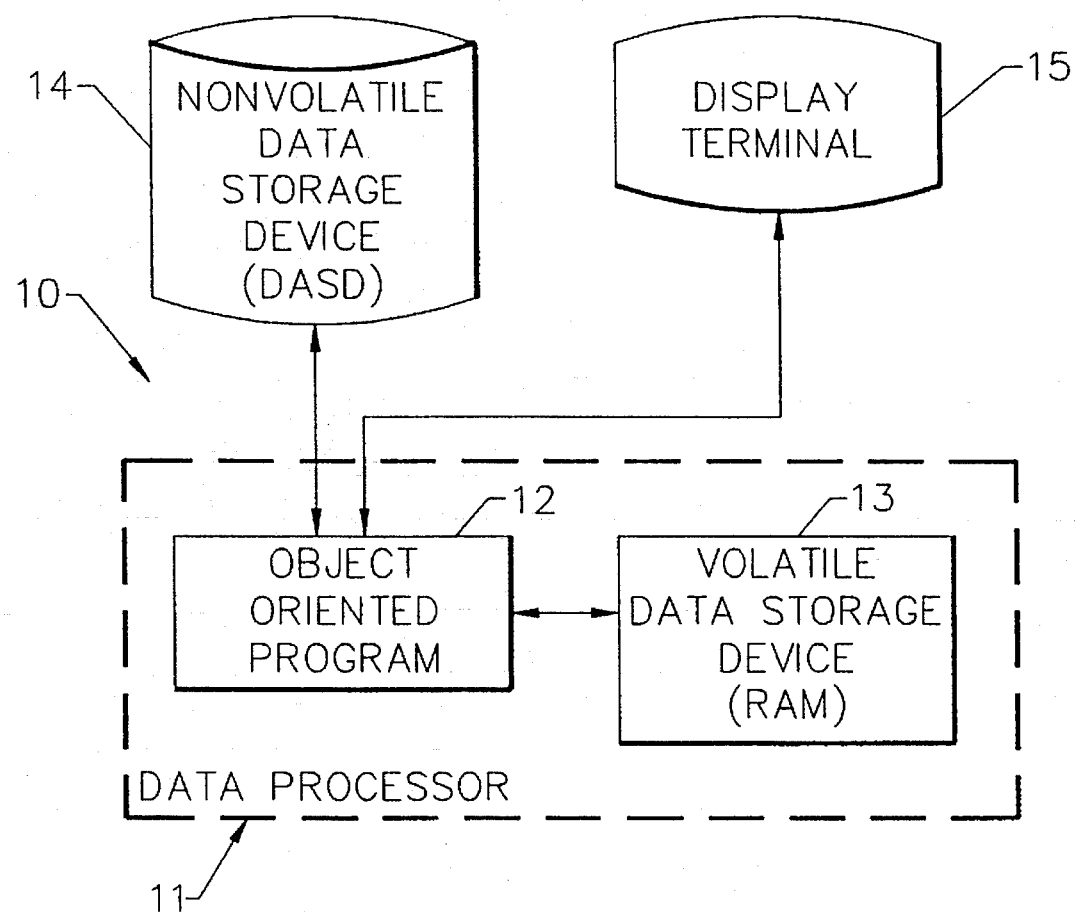
FIG. 1 illustrates a block diagram of an object oriented computing environment.
Figure 4:
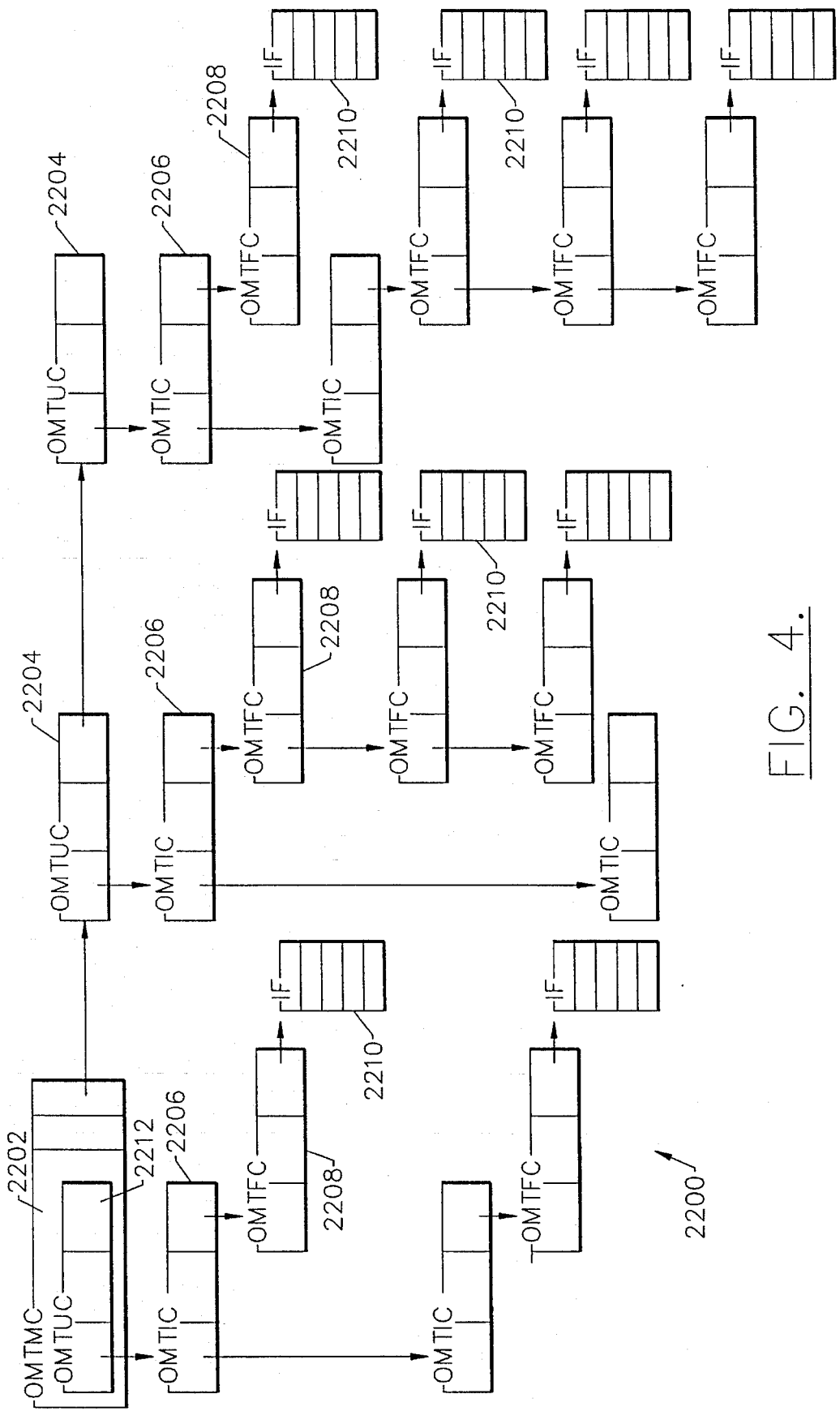
FIG. 4 illustrates the management table of FIG. 3 as a linked list.

Referring now to FIG. 1, which is a reproduction of FIG. 4 of the aforesaid application Ser. No. 07/425,607, a schematic block diagram of an object oriented computing environment 10 is illustrated. The object oriented computing environment 10 includes a data processor 11 which may be a mainframe computer, minicomputer, personal computer, or other hardware platform. For large databases having multiple users, a mainframe computer is typically employed. As is well known to those having skill in the art, the data processor 11 includes a volatile data storage device 13, typically random access memory (RAM) for providing a working store for active data and intermediate results. Data in RAM 13 is erased when power to the data processor 11 is removed or a new user session is begun.

Object oriented computing environment 10 also includes a nonvolatile data storage device 14 for permanent storage of objects. Device 14 may be a direct access storage device (DASD-a disk file) a tape file, an erasable optical disk or other well known devices. Nonvolatile data storage device 14 will also be referred to herein as a "database". Volatile data storage device 13 will also be referred to as "memory". A display terminal 15 including a cathode ray tube (CRT) or other display, and a keyboard, is also shown.

An object oriented operating program 12 runs or executes in data processor 11. Object oriented operating program 12 may be programmed in object oriented languages such as "C" or "Smalltalk" or variations thereof, or in conventional programming languages such as FORTRAN or COBOL. The design of an object oriented operating program 12 is well known to those skilled in the art of object oriented computing environments, and will only be described generally below.

Figure 2:
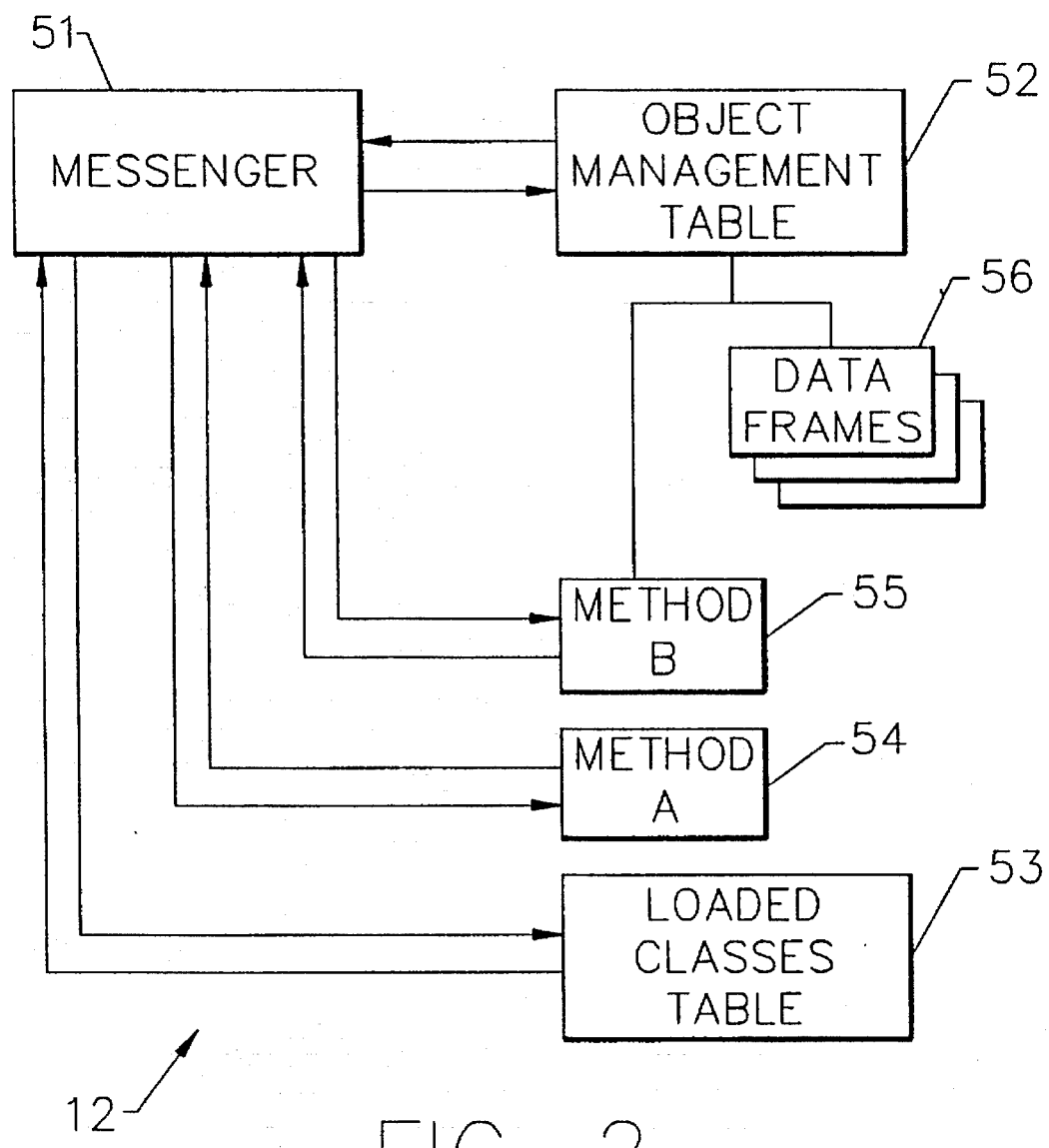
FIG. 2 illustrates a block diagram of an object oriented program.
Figure 5:
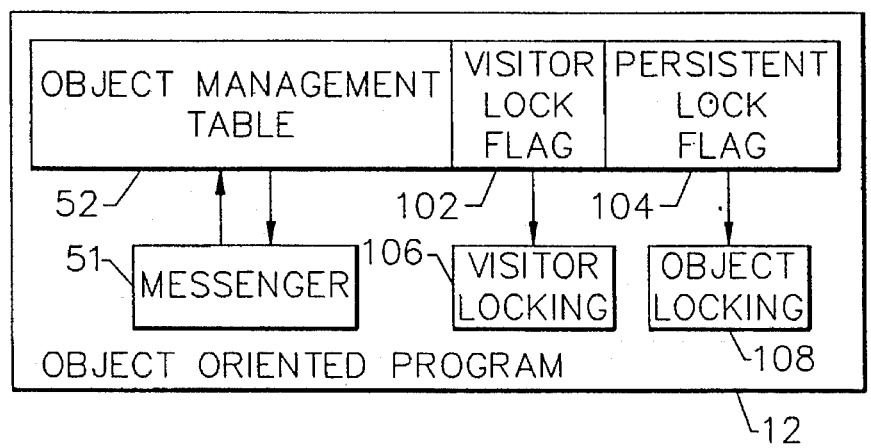
FIG. 5 illustrates a block diagram of a boundary control system according to the present invention.

Referring now to FIG. 2, which is a reproduction of FIG. 5 of the aforesaid application Ser. No. 07/425,607, the main components of an object oriented program (12, FIG. 1) will be described. A detailed description of the design and operation of an object oriented program is provided in "Object Oriented Software Construction", by Bertrand Meyer, published by Prentice Hall in 1988, the disclosure of which is incorporated herein by reference.

Referring to FIG. 2, object oriented program 12 includes three primary components: a Messenger 51, an Object Management Table 52 and a Loaded Classes Table 53. The Messenger 51 controls communication between calling and called messages, Object Management Table 52 and Loaded Classes Table 53. Object Management Table 52 contains a list of pointers to all active object instances. The Loaded Classes Table 53 contains a list of pointers to all methods of active object classes.

Operation of the Object Oriented Program 12 will now be described for the example illustrated in FIG. 2, in which Method A (block 54) of an object sends a message to Method B (block 55) of an object. Method A sends a message to Method B by calling Messenger 51. The message contains (1) an object reference of the instance to receive the message, (2) the method the object instance is requested to perform on the data it encapsulates, and (3) any parameters needed by the receiving method. Messenger 51 obtains a pointer to the data frame 56 of the instance object specified by Method A, by searching Object Management Table 52 for the instance object. If the specified instance object cannot be found, Object Management Table 52 adds the instance object to the table and calls the instance to materialize its data from the database. Once in the instance table, Object Management Table 52 returns the pointer to the materialized instance object.

Messenger 51 then obtains the address of Method B from the Loaded Classes Table 53. If the instance's class is not loaded, the Loaded Classes Table 53 will load it at this time to materialize its data. The Loaded Classes Table 53 searches for the specified method (Method B) and returns the address of the method to Messenger 51.

The Messenger 51 then calls Method B, passing it a system data area and the parameters from the call made by Method A including the pointer. Method B accesses the data frame 56 using the pointer. Method B then returns control to the Messenger 51 which returns control to Method A.

Figure 3:
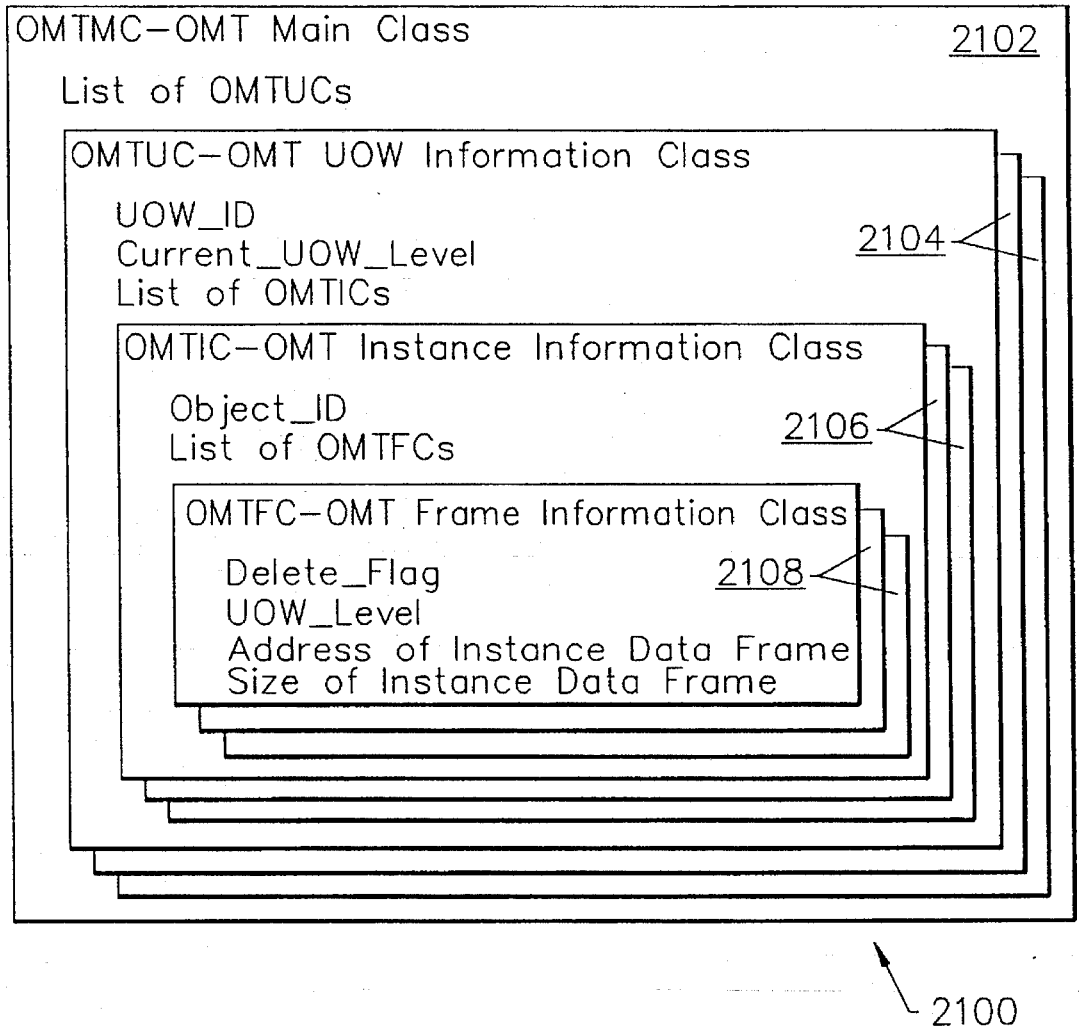
FIG. 3 schematically illustrates an object management table.

As already described, the object manager uses an object management table to control the operations thereof. Conceptually, the object management table is a multi-dimensional array including four related components. The object management table (OMT) is illustrated in FIG. 3, which is a reproduction of FIG. 21 of the aforesaid application Ser. No. 07/602,442. Each of the four components of the OMT 2100 will now be described.

1. OMT Main Class 2102:

The Object Management Table Main Class (OMTMC) is the anchor for the object manager to access the entire OMT. This object contains a list of entries, one for each Unit of Work (UOW) instance, beginning with the Global UOW Instance. These UOW instance entries are ordered chronologically. In other words, the last entry corresponds to the UOW instance most recently created or switched to; the next-to-last entry corresponds to the previously accessed UOW instance; and the first entry corresponds to the "oldest" (the least recently accessed) UOW instance.

2. OMT Unit of Work Information Class 2104:

The Object Management Table Unit of Work Information Class (OMTUC) keeps track of a UOW instance. It maintains a list of all the UOW instances. A new OMTUC is added to the list within the OMTMC when a new UOW instance is created. An OMTUC is deleted from the list within OMTMC when a UOW instance is discarded.

3. OMT Object Instance Information Class 2106:

The Object Management Table Object Instance Information (OMTIC) keeps track of an instance frame within the Current UOW instance. It maintains a list of all the UOW levels generated for the instance frame. A new OMTIC is added to the list within OMTUC whenever an object is materialized or created. The OMTIC is deleted when its containing OMTUC is discarded or when the instance frame has been marked for deletion and a commit is done at UOW level 1.

4. OMT Frame Information Class 2108:

The Object Management Table Frame Information Class (OMTFC) keeps track of the frame at a particular UOW level within the OMTIC. Additionally, it maintains a "delete" flag to indicate whether or not the instance is to be deleted. A new OMTFC is added to the list within OMTIC when a UOW Notify is issued against the corresponding instance and the data frame is not at the Current UOW level. The Current UOW level is found within the OMTUC. A OMTFC is deleted whenever its UOW level is committed or rolled back, or otherwise discarded.

Although the OMT has been described as a table, the table may be implemented as a linked list format for a sample group of Instance Fames as shown at FIG. 4, which is a reproduction of FIG. 22 of aforesaid application Ser. No. 07/602,442. The OMTMC 2202 anchor contains an OMTUC for the Global UOW. Additionally, the OMTMC contains a pointer to an OMTUC for the first non-global UOW Instance. Each OMTUC 2204 contains a pointer to the next OMTUC as well as a pointer to the first OMTIC 2206 within the OMTUC. The OMTUCs 2204 are maintained in a List of other Units of Work, separate from the Global UOW 2212. Each OMTIC contains a pointer to the first OMTFC 2208 within the OMTIC as well as a pointer to the next OMTIC. Finally, the OMTFC contains a pointer to the actual Instance Frame (IF) 2210 and a pointer to the next OMTFC.

The OM can switch to any UOW in the list of Units of Work. Because the Global UOW is not kept in the List, the OM cannot switch to the Global UOW. If the Global UOW cannot be switched, it cannot be current. If the Global UOW is not current it cannot be discarded, committed or rolled back.

IF resolution is a process associated with the OMT and UOW to materialize data into memory. When an instance object is called, the object manager will look into the Current UOW and into the Global UOW to locate an entry with a matching object ID for the instance being called. If this search scope does not resolve the matching object, and if it is a persistent object, then a frame will be allocated in memory to hold the persistent data. This new object will be called to materialize its data from the database. Thus, objects are automatically materialized, using what is called auto-materialization.

Object references may be either resolved or unresolved. As noted above, the object reference comprises the object ID which identifies the object. The object reference also comprises an access address. The access address is set to point to the correct entry in the OMT the first time the object is resolved. Once an object reference is resolved, no further search for the object ID is needed.

For an unresolved object reference, the access address is set to point to the correct entry in the OMT. Once it is resolved, the object manager must make sure that the entry matches the correct object attribute, and make sure that it is in either the Current or Global UOW.

If a message is sent using a resolved object reference that already points to an entry, but the entry is in a non-Current UOW (i.e., not in Current and not in Global), a visitor object must be created. A copy of the object is made in the current UOW and then the message is sent to the copy of the object, rather than to the original object. Thus, during the resolve process, persistent objects are found and materialized and visitor objects are created.

The unit of work mechanism provides a rich and flexible object manipulation environment which allows the object oriented computing environment to manipulate, update, allocate and discard memory in terms of sets of objects and operations upon objects, rather than by manipulating memory pointers as in traditional languages like C and Pascal. At the same time, however, this flexibility allows so much latitude that undesirable side effects can be produced. Two examples of undesirable side effects will now be described.

First, when a child panel, window or file type command attempts to use an OREF from a parent panel, window or file type, a persistent visitor object is created from the parent's unit of work. In general, the child panel, window or file type command should obtain the object from the database instead. The object manager can deal with this problem by specifically forcing retrieval of persistent objects from the database in response to specific messages. However, the present invention allows a more generic or global specification that objects should be retrieved from the database rather than from memory.

In a second example, when a child panel, window or file type command attempts to make a change to a persistent object, it often mistakenly occurs in the parent panel, window or files unit of work. It is difficult to detect this error. The present invention allows the object management system to identify this behavior in a more automatic manner.

Boundary Control Method and System: Overall Design and Operation

Referring now to FIG. 5, a block diagram of a boundary control system according to the present invention will now be described. As shown, the boundary control system is preferably implemented in object oriented program 12 (FIG. 1), however, other implementations are possible. As also shown in FIG. 5, the boundary control system may be integrated into the object management scheme by adding a visitor lock flag 102 and a persistent lock flag 104 to the object management table 52. A flag is maintained for each unit of work in the table. Each flag is in one of two states, referred to herein as "ON" and "OFF".

Visitor locking means 106 is responsive to the state of the visitor lock flag of an appropriate unit of work, for preventing copying of an object from a first unit of work to a second unit of work when the visitor flag associated with the first unit of work is ON, and for allowing copying of the object from the first unit of work to the second unit of work when the visitor flag associated with the first unit of work is OFF. Object locking means 108 is responsive to the persistent lock flag 104 associated with a particular unit of work, for locking the object within the unit of work when the associated persistent lock flag is ON and for unlocking the object when the flag is OFF. Locking may prevent additions, deletions or any other changes to the unit of work and unlocking may allow additions, deletions, and any other changes to the unit of work. Preferably, the visitor locking means and object locking means 106 and 108, respectively, only operate on persistent objects in the associated unit of work to which the flag is applied, so that database integrity is maintained.

Figure 6:
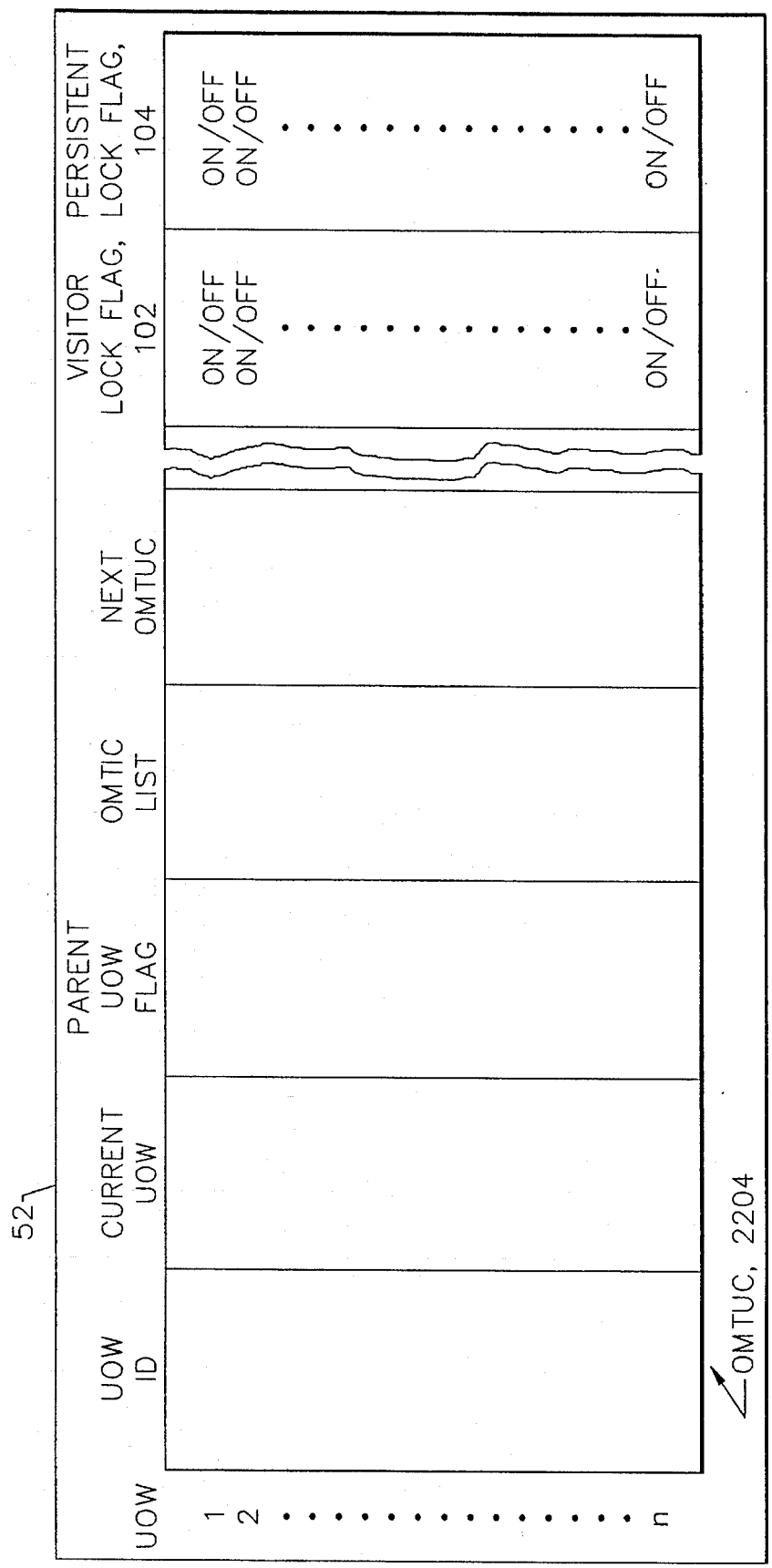
FIG. 6 illustrates an object management table according to the present invention.

Referring now to FIG. 6, a preferred embodiment of the object management table 52, including visitor lock flag 102 and persistent lock flag 104, is described. As shown, visitor lock flag 102 and persistent lock flag 104 are preferably added to the Object Management Table Unit of Work Information Class (OMTUC) table 2204 described in connection with FIGS. 3 and 4. As already described, this table maintains a list of all of the UOW instances. Accordingly, the table includes rows for identifying a UOW ID, Current UOW, Parent UOW Flag, OMTIC List, Next OMTUC, and other parameters as necessary.

According to the invention, each unit of work (OMTUC row) includes a visitor lock flag 102 and a persistent lock flag 104 associated therewith, with each flag being in one of two states, designated as ON or OFF in FIG. 6. It will be understood by those having skill in the art that OMTUC table 2204 may also be embodied in a link list format as described in FIG. 4 using techniques well known to those having skill in the art. It will also be understood that the visitor lock flag and persistent lock flag may be used independently, although they are preferably used together.

Figure 7:
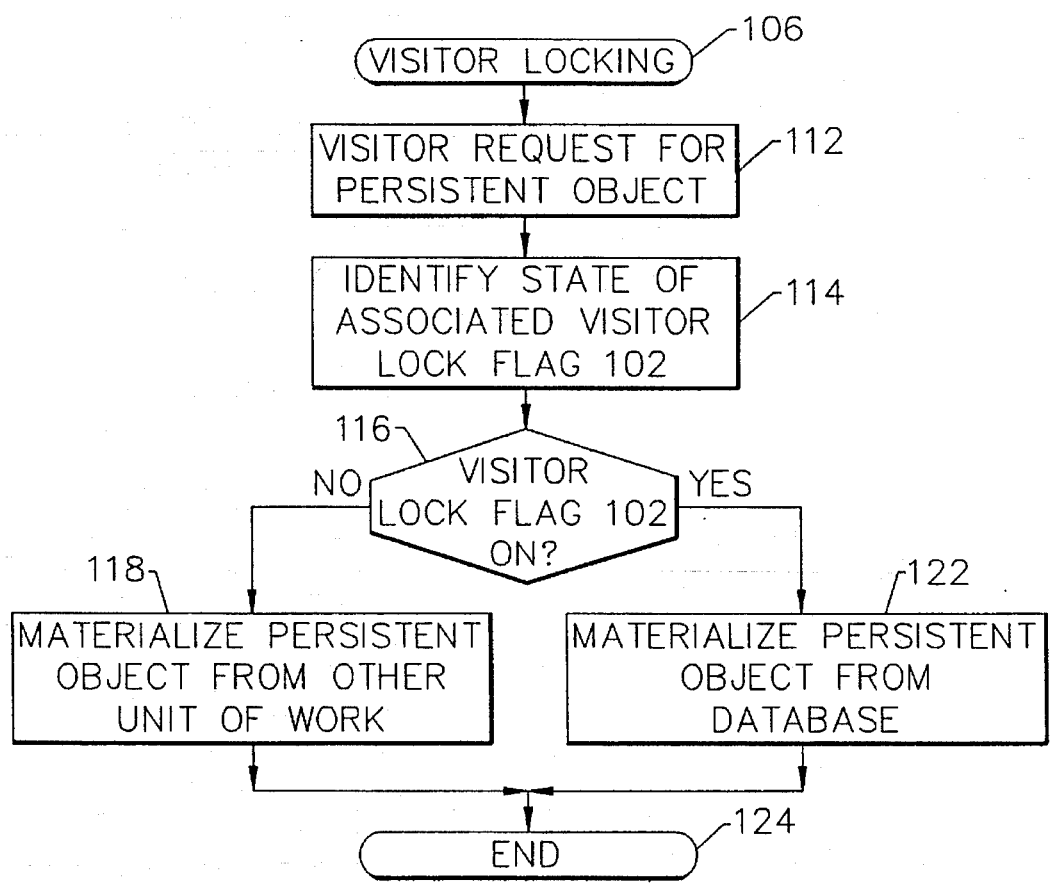
FIG. 7 illustrates operations performed by the visitor locking means of FIG. 5.

Referring now to FIG. 7 operations performed by visitor locking means 106 (FIG. 5) will now be described. As shown in FIG. 7, upon request for a persistent object in another UOW, not the current UOW (Block 112), the state of the associated visitor lock flag 102 is identified (Block 114). If visitor lock flag 102 is OFF (Block 116), then the persistent object is materialized from the other UOW into current unit of work at Block 118. As already described, this is called a "visitor". On the other hand, if the associated visitor lock flag 102 is ON (Block 116), then the persistent object is materialized from the database at Block 122. Processing ends at Block 124.

Figure 8:
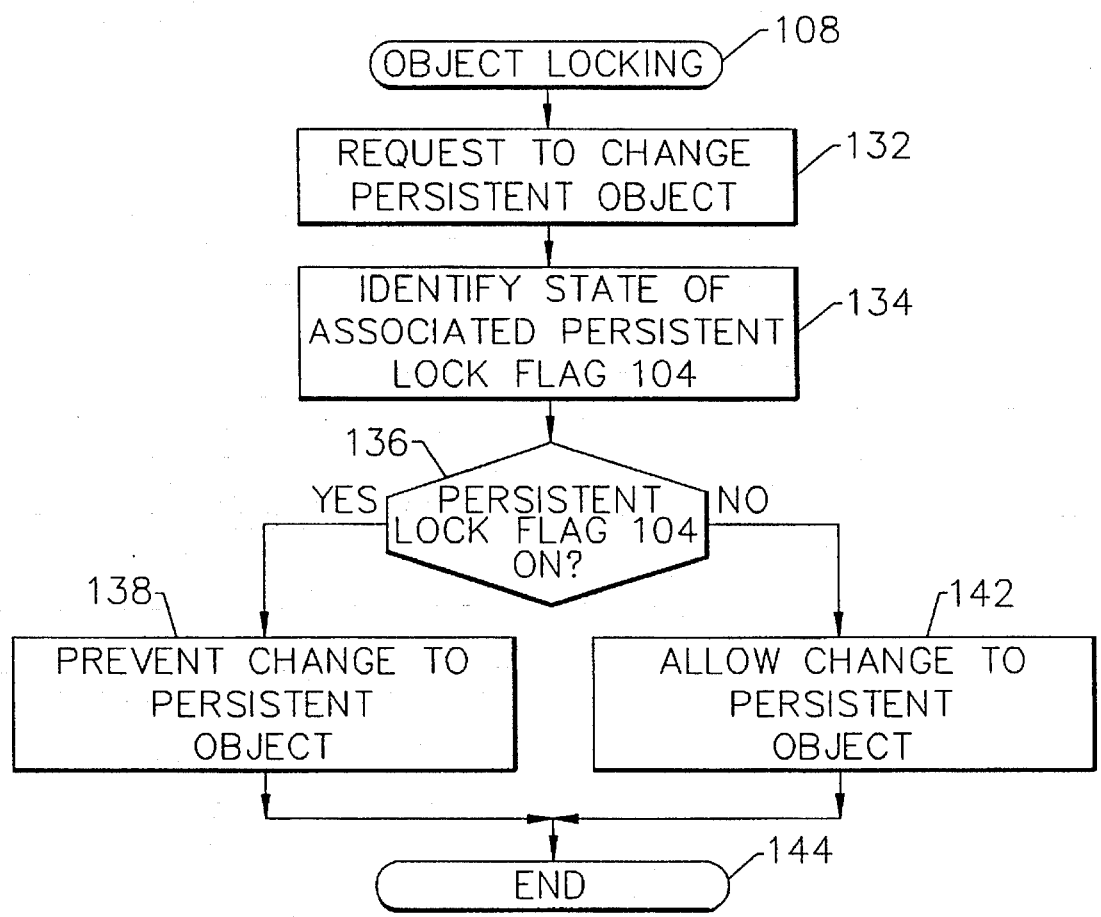
FIG. 8 illustrates operations performed by the object blocking means of FIG. 5.

Referring now to FIG. 8, operations for object locking means 108 (FIG. 5) will now be described. In response to the request to change a persistent object (Block 132) by adding, notifying or deleting an object in a unit of work, the state of the associated persistent lock flag 104 is identified at Block 134. If the persistent lock flag 104 is ON (Block 136), then changes to the persistent object are prevented (Block 138) and an error message may be generated. On the other hand, if the persistent lock flag 104 is OFF (Block 136), then the requested change to the persistent object is permitted at Block 142. Processing then ends at Block 144.

Boundary Control Method and System: Detailed Implementation

The detailed design and implementation of the boundary control for the unit of work according to the present invention will now be described. Processing of the visitor lock flag will first be described followed by processing of the persistent lock flag.

PERSISTENT VISITORS OFF, 122

This operation forces all persistent objects in the current unit of work which are referenced in other units of work to be materialized from the database, rather than becoming visitors in that other unit of work. As already described, a visitor is a copy of the object in the current unit of work made from the other unit of work in which it resides at the time the message is made.

Figure 9:
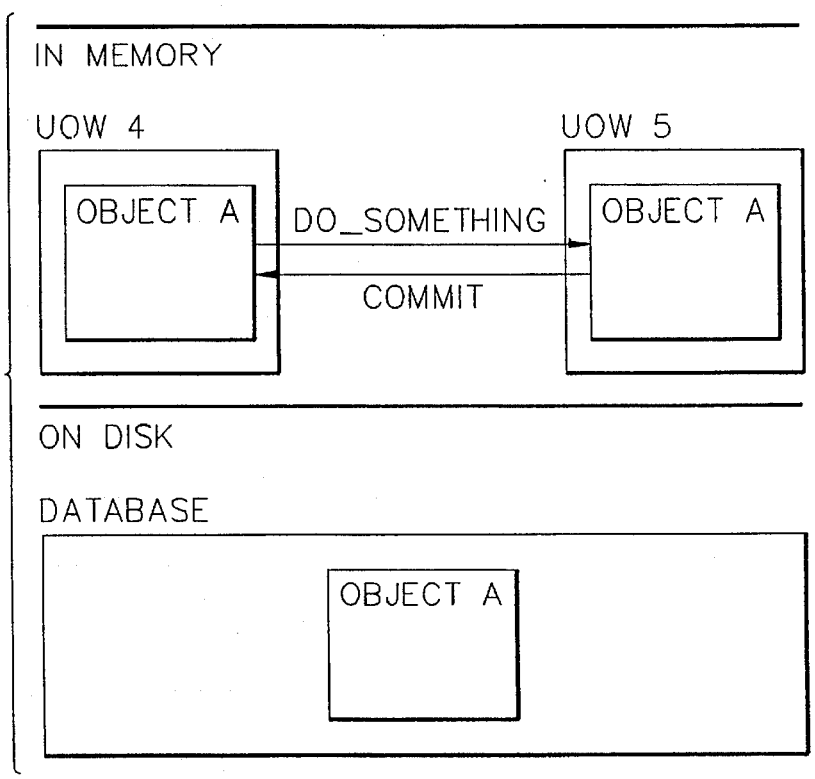
FIG. 9 schematically illustrates operation of the visitor locking means of FIG. 5 when the visitor lock flag is in the OFF state.
Figure 10:
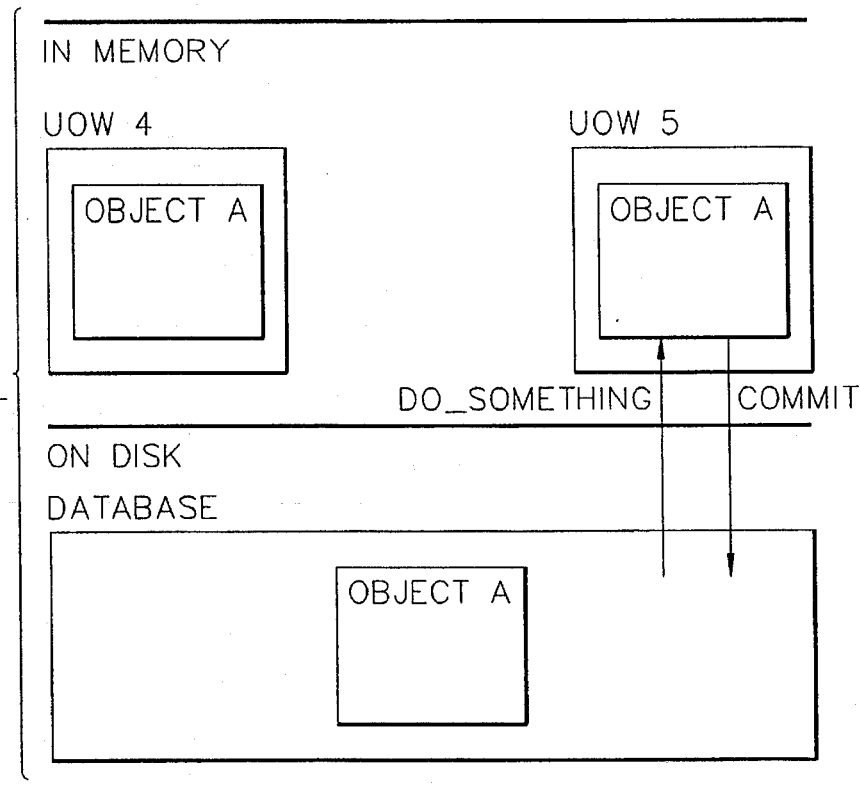
FIG. 10 schematically illustrates operation of the visitor locking means of FIG. 5 when the visitor lock flag is in the ON state.

For example, referring to FIG. 9, assume a persistent object, Object_A, in unit of work 4, and assume a message is sent to object_A from unit of work 5 and then unit of work 5 is committed:

Object_A.do_something;

UOW.commit;

With persistent visitors ON (the default state), Object_A will be retrieved from unit of work 4 and committed to unit of work 4 shown in FIG. 9. With persistent visitors OFF, however, Object_A will be retrieved from the database and committed to the database shown in FIG. 10. Pseudocode for this operation is:

```
-- CLASS METHOD
--*****************************************************
--*
--* METHOD NAME:       uow_pers_visit_off
--*
--* DESCRIPTION:
--*     This procedure will force all persistent
--*     objects in this
--*     current unit of work that are referenced in
--*     other units
--*     of work to be materialized from the database
--*     rather than
--*     becoming visitors in that other unit of work.
--*
--* NOTES:
--*
--*****************************************************
    procedure uow_pers_visit_off
        <*(* Prevent any persistent object in this uow
            from becoming a visitor in any other uow.
            *)*>;
    begin
    -- LOGIC
        <*(* Mark the unit of work control block for the
            current unit of work so that no persistent
            instance in this uow will become a visitor in
            another uow. *)*> is
        current_unit_of_work.visit_lock := TRUE;
    end uow_pers_visit_off;
```

PERSISTENT VISITORS ON, 118

This operation allows persistent instances in the current unit of work to become visitors in other units of work. This is the default state for a new unit of work instance.

```
-- CLASS METHOD
--*****************************************************
--*
--* METHOD NAME:       uow_pers_visit_on
--*
--* DESCRIPTION:
--*     This procedure will allow persistent
--*     instances in this
--*     current unit of work to become visitors in
--*     other
--*     units of work.
--*     This is the default state for a new unit of
--*     work instance.
--*
--* NOTES:
--*
--*****************************************************
    procedure uow_pers_visit_on
        <* (* Allow any persistent object in this uow to
            become a visitor in any other uow. Restart
            normal operations. *)*>;
    begin
    -- LOGIC
        <*(* Reset the unit of work control block for the
            current unit of work so that no persistent
            instances in this uow can become a visitor in
            another uow. *)*> is
        current_unit_of_work.visit_lock := FALSE;
    end uow_pers_visit_on;
```

PERSISTENT LOCK, 138

This operation locks the current unit of work instance so that no persistent objects can be added, notified, or deleted in the unit of work. The messenger raises the exception INVALID_PERS_UOW_ACTION if an attempt is made to add, notify, or delete an object in a unit of work in which uow_pers_lock is set.

For example, assume units of work 4, 5, and 6, each containing a set of one or more persistent objects. Assume also that a method is running as follows:

UOW.switch(UOW4);

Object_A.do_something;

UOW.switch(UOW5);

Object_B.do_someting_too;

The programmer may intend to manipulate objects in both units of work 4 and 5. However, the programmer may have intended to switch to unit of work 6, but a programming error has caused a switch to unit of work 5 instead. In this case, unit of work 5 most likely would have locked itself from external tampering and the message Object_B.do_someting_too;

would have raised the exception INVALID_PERS_UOW_ACTION instead of allowing the program to inadvertently change the unit of work. This type of error is particularly difficult to debug since this unintended modification may not show up until much later in the program.

Pseudocode for this operation is:

```
-- CLASS METHOD
--*****************************************************
--*
--* METHOD NAME:       uow_pers_lock
--*
--* DESCRIPTION:
--*     This procedure will lock the current unit of
--*     work instance
--*     so that no persistent objects can be added,
--*     notified, or
--*     deleted in the unit of work.
--*
--*     The messenger will raise the exception
--*     UOW_PERS_LOCK if
--*     an attempt is made to add (either create or
--*     materialize),
--*     notify, or delete an object in a UOW in which
--*     uow_pers_lock
--*     is set.
--*
--* NOTES:
--*
--*****************************************************
    procedure uow_pers_lock
        <* (* Lock the current unit of work instance *)
        *>;
    begin
    -- LOGIC
        <*(* Mark the unit of work control block for the
            current unit of work so that no persistent
            object can be added, notified or deleted in the
            current unit of work. *)*> is
        current_unit_of_work.pers_lock := TRUE;
    end uow_pers_lock;
```

PERSISTENT UNLOCK, 142

This operation unlocks the current unit of work instance so that persistent objects can be added, notified, or deleted in the unit of work. This is the default state for a new unit of work instance. Pseudocode for this operation is:

```
-- CLASS METHOD
--*******************************************************
--*
--* METHOD NAME:         uow_pers_unlock
--*
--* DESCRIPTION:
--*     This procedure will unlock the current unit
--*     of work instance
--*     so that persistent objects can be added,
--*     notified, or deleted
--*     in the unit of work. This is the default
--*     state for a new unit
--*     of work instance.
--*
--* NOTES:
--*
--*******************************************************
    procedure uow_pers_unlock
        <* (* Unlock the unit of work to allow objects to
            be added or notified in the unit of work.
            *)*>;
begin
-- LOGIC
    <*(* Reset the unit of work control block for the
        current unit of work so that persistent objects
        can once again be added, notified and deleted
        in this unit of work *)*> is
    current_unit_of_work.pers_lock := FALSE;
end uow_pers_unlock;
```

UOW PERSISTENT LOCK STATE

This operation will return the persistent lock state of the current unit of work. TRUE means that the UOW is locked and FALSE means that it is not locked.

```
-- CLASS METHOD
--*******************************************************
--*
--* METHOD NAME:         uow_is_pers_locked
--*
--* DESCRIPTION:
--*     This procedure will return TRUE if the
--*     current UOW is
--*     persistent locked. It will return FALSE if
--*     it is not.
--*
--* NOTES:
--*
--*******************************************************
    function uow_is_pers_locked
        <*(* Return TRUE if the UOW is persistent locked.
            Return FALSE otherwise. *)*>
        returns BOOTLEAN;
```

A similar operation can return the state of the visitor lock flag.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An object management system for an object oriented computing environment on a computing platform, said object oriented computing environment including a plurality of objects each including an object frame containing data attributes, and at least one object method for performing actions on the associated object, at least some of said objects being organized into a plurality of units of work, such that the objects in a unit of work are manipulated as a group to perform a task, said object management system comprising:

an object management table, including a listing of said plurality of units of work and pointers to the objects contained therein, said object management table further including a visitor lock flag for each of said plurality of units of work, each visitor lock flag being in one of a first state and a second state, and a persistent lock flag for each of said plurality of units of work, each persistent lock flag being in one of a first state and a second state;

visitor locking means for preventing copying of an object from a first unit of work to a second unit of work in response to the visitor lock flag associated with said first unit of work being in said first state, and for allowing copying of said object from said first unit of work to said second unit of work in response to the visitor lock flag associated with said first unit of work being in said second state; and object locking means for locking an object within said first unit of work in response to the persistent lock flag associated with said first unit of work being in said first state, and for unlocking said object from said first unit of work in response to the persistent lock flag associated with said first unit of work being in said second state.

2. The object management system of claim 1 wherein said object locking means comprises means for preventing addition of an object to said first unit of work in response to the persistent lock flag associated with said first unit of work being in said first state, and for allowing addition of an object to said first unit of work in response to the persistent lock flag associated with said first unit of work being in said second state.

3. The object management system of claim 1 wherein said object locking means comprises means for preventing deletion of an object from said first unit of work in response to the persistent lock flag associated with said first unit of work being in said first state, and for allowing deletion of an object from said first unit of work in response to the persistent lock flag associated with said first unit of work being in said second state.

4. The object management system of claim 1 wherein said object locking means comprises means for preventing change to an object in said first unit of work in response to the persistent lock flag associated with said first unit of work being in said first state, and for allowing change to an object in said first unit of work in response to the persistent lock flag associated with said first unit of work being in said second state.

5. The object management system of claim 1 wherein said computing platform includes volatile storage means, and wherein at least some of said objects are persistent objects which are stored in said volatile storage means, said object locking means comprising means for locking a persistent object from a first unit of work in response to the persistent lock flag associated with said first unit of work being in said first state, and for unlocking said persistent object from said first unit of work in response to the persistent lock flag associated with said first unit of work being in said second state.

6. The object management system of claim 5 wherein said object locking means further comprises means for preventing addition of a persistent object to said first unit of work in response to the persistent lock flag associated with said first unit of work being in said first state, and for allowing addition of a persistent object to said first unit of work in response to the persistent lock flag associated with said first unit of work being in said second state.

7. The object management system of claim 5 wherein said object locking means comprises means for preventing deletion of a persistent object from said first unit of work in response to the persistent lock flag associated with said first unit of work being in said first state, and for allowing deletion of a persistent object from said first unit of work in response to the persistent lock flag associated with said first unit of work being in said second state.

8. The object management system of claim 5 wherein said object locking means comprises means for preventing change to a persistent object in said first unit of work in response to the persistent lock flag associated with said first unit of work being in said first state, and for allowing change to a persistent object in said first unit of work in response to the persistent lock flag associated with said first unit of work being in said second state.

9. The object management system of claim 1 wherein said object management table includes an Object Management Table Unit of Work Information Class (OMTUC) table for listing the unit of work instance, and wherein said object lock flag is included in said OMTUC table.

10. The object management system of claim 1 wherein said computing platform includes nonvolatile storage means, and wherein at least some of said objects are persistent objects which are stored in said nonvolatile storage means, said visitor locking means comprising means for preventing copying of a persistent object from said first unit of work to said second unit of work in response to the visitor lock flag associated with said first unit of work being in said first state, for allowing copying of a persistent object from said nonvolatile storage means to said second unit of work in response to the visitor lock flag associated with said first unit of work being in said first state, and for allowing copying of said persistent object from said first unit of work to said second unit of work in response to the visitor lock flag associated with said first unit of work being in said second state.

11. The object management system of claim 10 wherein said object management table includes an Object Management Table Unit of Work Information Class (OMTUC) table for listing the unit of work instances, and wherein said visitor lock flag is included in said OMTUC table.

12. An object management method for an object oriented computing environment on a computing platform, said object oriented computing environment including a plurality of objects each including an object frame-containing data attributes, and at least one object method for performing actions on the associated object, at least some of said objects being organized into a plurality of units of work, such that the objects in a unit of work are manipulated as a group to perform a task, said object oriented computing environment further comprising an object management table, including a listing of said plurality of units of work and pointers to the objects contained therein, said object management table further including a visitor lock flag for each of said plurality of units of work, each visitor lock flag being in one of a first state and a second state, and a persistent lock flag for each of said plurality of units of work, each persistent lock flag being in one of a first state and a second state, said object management method comprising the steps of:

preventing copying of an object from a first unit of work to a second unit of work in response to the visitor lock flag associated with said first unit of work being in said first state;

allowing copying of said object from said first unit of work to said second unit of work in response to the visitor lock flag associated with said first unit of work being in said second state;

locking an object within said first unit of work in response to the persistent lock flag associated with said first unit of work being in said first state; and unlocking said object from said first unit of work in response to the persistent lock flag associated with said first unit of work being in said second state.

13. The object management method of claim 12:

wherein said locking step comprises the step of preventing addition of an object to said first unit of work in response to the persistent lock flag associated with said first unit of work being in said first state: and wherein said unlocking step comprises the step of allowing addition of an object to said first unit of work in response to the persistent lock flag associated with said first unit of work being in said second state.

14. The object management method of claim 12:

wherein said locking step comprises the step of preventing deletion of an object from said first unit of work in response to the persistent lock flag associated with said first unit of work being in said first state: and wherein said unlocking step comprises the step of allowing deletion of an object from said first unit of work in response to the persistent lock flag associated with said first unit of work being in said second state.

15. The object management method of claim 12:

wherein said locking step comprises the step of preventing change to an object in said first unit of work in response to the persistent lock flag associated with said first unit of work being in said first state: and wherein said unlocking step comprises the step of allowing change to an object in said first unit of work in response to the persistent lock flag associated with said first unit of work being in said second state.

16. The object management method of claim 12 wherein said computing platform includes volatile storage means, and wherein at least some of said objects are persistent objects which are stored in said volatile storage means;

said locking step comprising the step of locking a persistent object from a first unit of work in response to the persistent lock flag associated with said first unit of work being in said first state; and said unlocking step comprising the step of unlocking said persistent object from said first unit of work in response to the persistent lock flag associated with said first unit of work being in said second state.

17. The object management method of claim 16:

wherein said locking step further comprises the step of preventing addition of a persistent object to said first unit of work in response to the persistent lock flag associated with said first unit of work being in said first state; and wherein said unlocking step further comprises the step of allowing addition of a persistent object to said first unit of work in response to the persistent lock flag associated with said first unit of work being in said second state.

18. The object management method of claim 16:

wherein said locking step further comprises the step of preventing deletion of a persistent object from said first unit of work in response to the persistent lock flag associated with said first unit of work being in said first state; and wherein said unlocking step further comprises the step of allowing deletion of a persistent object from said first unit of work in response to the persistent lock flag associated with said first unit of work being in said second state.

19. The object management method of claim 16:

wherein said locking step further comprises the step of preventing change to a persistent object in said first unit of work in response to the persistent lock flag associated with said first unit of work being in said first state; and wherein said unlocking step further comprises the step of allowing change to a persistent object in first unit of work in response to the persistent lock flag associated with said said first unit of work being in said second state.

20. The object management method of claim 12 wherein said computing platform includes nonvolatile storage means, and wherein at least some of said objects are persistent objects which are stored in said nonvolatile storage means;

said preventing step comprising the steps of: preventing copying of a persistent object from said first unit of work to said second unit of work in response to the visitor lock flag associated with said first unit of work being in said first state; and allowing copying of a persistent object from said nonvolatile storage means to said second unit of work in response to the visitor lock flag associated with said first unit of work being in said first state; and said allowing step comprising the step of allowing copying of said persistent object from said first unit of work to said second unit of work in response to the visitor lock flag associated with said first unit of work being in said second state.

* * * * *

UNITED STATES PATENT AND TRADEMARK OFFICE
CERTIFICATE OF CORRECTION

PATENT NO. : 5,488,721

DATED : January 30, 1996

INVENTOR(S) : Rich, et al.

It is certified that error appears in the above-identified patent and that said Letters Patent is hereby corrected as shown below:

On the cover page, Item [75], in the listing for the second inventor, "Beauford" should be -- Buford --.

On the cover page, Item [56], line 6 of the U.S. Patent Documents under References Cited, "Wilkenson et al." should be -- Wilkinson et al. --.

Column 1, line 8, after "abandoned" insert -- . --.

Column 4, line 2, begin a new paragraph with "FIG. 3."

Column 8, line 25, "0N" should be -- ON --.

Column 8, line 49, "0N" should be -- ON --.

Column 9, line 46, insert the paragraph: -- Pseudocode for this operation is: --.

Column 9, line 67, delete "no."

Column 11, line 48, "BOOTLEAN" should be -- BOOLEAN --.

UNITED STATES PATENT AND TRADEMARK OFFICE
CERTIFICATE OF CORRECTION

PATENT NO. : 5,488,721

DATED : January 30, 1996

INVENTOR(S) : Rich, et al.

It is certified that error appears in the above-identified patent and that said Letters Patent is hereby corrected as shown below:

Column 13, line 44, "frame-containing" should be -- frame containing --.

Column 15, line 10, after "in" insert -- said --.

Signed and Sealed this

Twenty-eighth Day of May, 1996

Attest:

BRUCE LEHMAN

*Attesting Officer*   *Commissioner of Patents and Trademarks*